United States Patent [19]
Goodwin, III et al.

[11] Patent Number: 5,914,670
[45] Date of Patent: Jun. 22, 1999

[54] METHOD OF ASSIGNING PROMOTIONAL MESSAGES TO ELECTRONIC PRICE LABELS

[75] Inventors: John C. Goodwin, III, Suwanee; Terry L. Zimmerman, Lawrenceville, both of Ga.

[73] Assignee: NCR Corporation, Dayton, Ohio

[21] Appl. No.: 08/721,602

[22] Filed: Sep. 25, 1996

[51] Int. Cl.[6] .................................................. G06K 15/00
[52] U.S. Cl. .............................. 340/825.52; 340/825.35; 340/825.55; 235/383; 235/385; 705/14
[58] Field of Search ................. 340/825.52, 825.35, 340/825.55; 235/383, 385, 375; 705/14

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,825,045 | 4/1989 | Humble | 235/383 |
| 5,172,314 | 12/1992 | Poland et al. | 364/401 |
| 5,198,644 | 3/1993 | Pfeiffer et al. | 235/383 |
| 5,401,947 | 3/1995 | Poland | 235/383 |
| 5,448,226 | 9/1995 | Failing, Jr. et al. | 340/825.35 |

*Primary Examiner*—William A. Cuchlinski, Jr.
*Assistant Examiner*—Yonel Beaulieu
*Attorney, Agent, or Firm*—Paul W. Martin; Peter H. Priest

[57] ABSTRACT

A method of displaying a promotional message by an electronic price label (EPL) which stores promotional messages and corresponding promotional indicators in a memory within the EPL. Once the promotional messages are stored within the memory of the EPL, the promotional messages no longer need to be sent by a controlling computer each time a promotional message must be displayed by the EPL. The controlling computer transmits a promotional indicator to the EPL. The EPL compares the promotional indicator in the message with the promotional indicators stored within the memory. The EPL displays a promotional message associated with one of the promotional indicators within the memory if the promotional indicator in the memory and the promotional indicator in the message are equal.

15 Claims, 3 Drawing Sheets

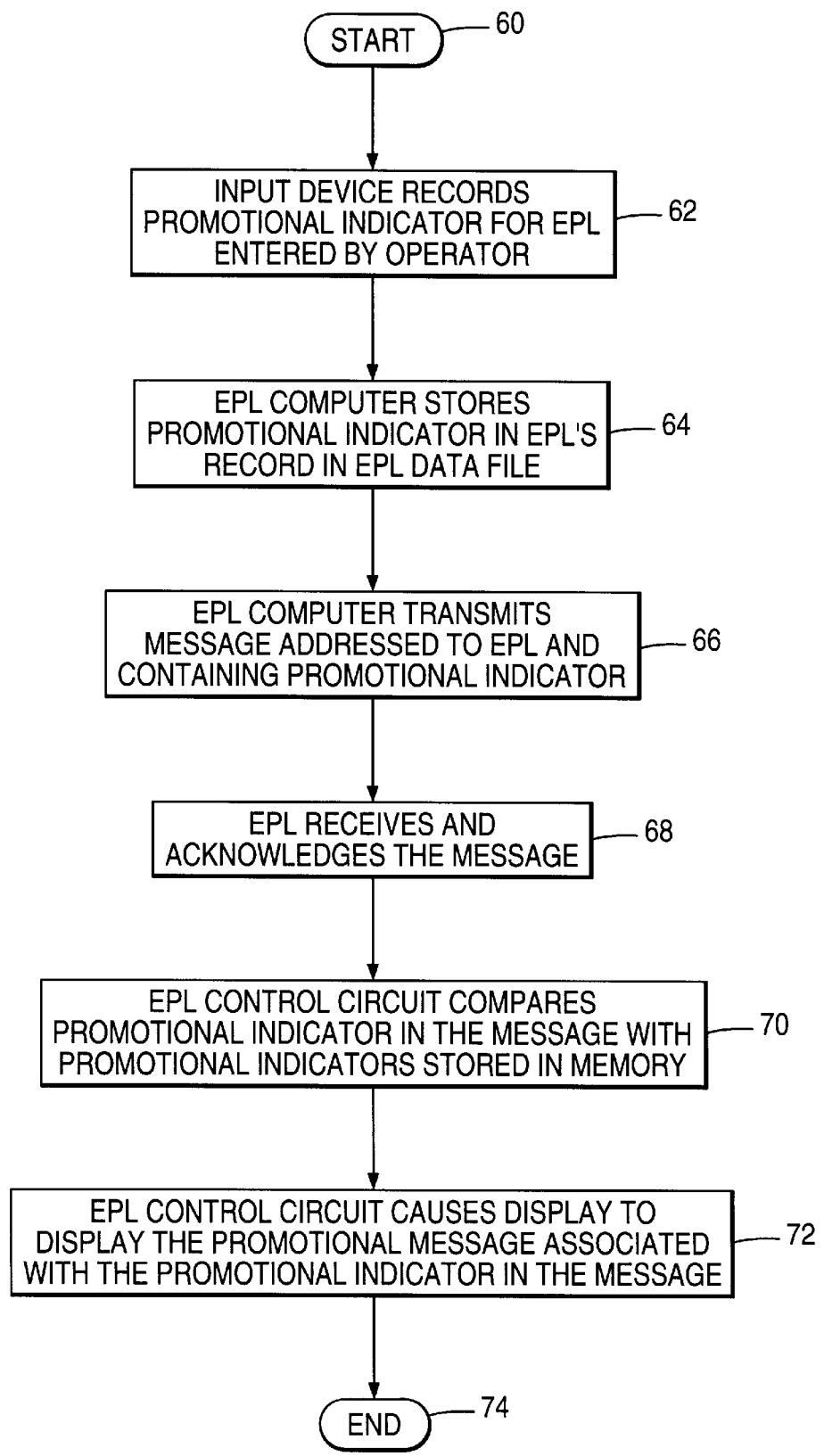

METHOD OF ASSIGNING PROMOTIONAL MESSAGES TO ELECTRONIC PRICE LABELS

BACKGROUND OF THE INVENTION

The present invention relates to electronic signage, and more specifically to a method of assigning promotional messages to electronic price labels (EPLs).

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

During special promotions, EPL systems cannot display the correct price, particular in the case of promotions such as "buy one, get one free" (BOGO). For example, if the cost of an item is one dollar during a BOGO promotion, the manager of the transaction establishment cannot display a price of fifty cents to imply that each of two purchased items is fifty cents, nor can the manager display a price of one dollar to imply that two purchased items may be purchased for one dollar.

Thus, a promotional message which is printed on a paper shelf talker or bib and which explains the promotion must be placed adjacent the EPL for the item. However, paper shelf talkers must be installed manually, thereby increasing the cost and setup time associated with special promotions.

Therefore, it would be desirable to provide a method of assigning promotional messages to EPLs so that the EPLs display promotional messages instead of paper shelf talkers.

SUMMARY OF THE INVENTION

In accordance with the teachings of the present invention, a method of assigning promotional messages to electronic price labels is provided.

The method stores promotional messages and corresponding promotional indicators in a memory within the EPL. Once the promotional messages are stored within the memory of the EPL, the promotional messages no longer need to be sent by a controlling computer each time a promotional message must be displayed by the EPL. The controlling computer transmits a promotional indicator to the EPL. The EPL compares the promotional indicator in the message with the promotional indicators stored within the memory. The EPL displays a promotional message associated with one of the promotional indicators within the memory if the promotional indicator in the memory and the promotional indicator in the message are equal.

It is accordingly an object of the present invention to provide a method of assigning promotional messages to electronic price labels.

It is another object of the present invention to provide a method of assigning promotional messages that involves the use of an indexed list of promotional messages, any one of which can be assigned to a particular EPL.

It is another object of the present invention to provide a method of assigning promotional messages to electronic price labels that makes paper shelf talkers unnecessary.

It is another object of the present invention to provide a method of assigning promotional messages to electronic price labels in which a number of EPLs can display the same message at the same time.

It is another object of the present invention to provide a method of assigning promotional messages to electronic price labels in which the most common types of promotional messages are stored in EPLs, in order to save on communications band width.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating a method of instructing an EPL to display a particular promotional message.

DETAILED DESCRIPTION OF THE PREFERRED EMBODIMENT

Figure 1:
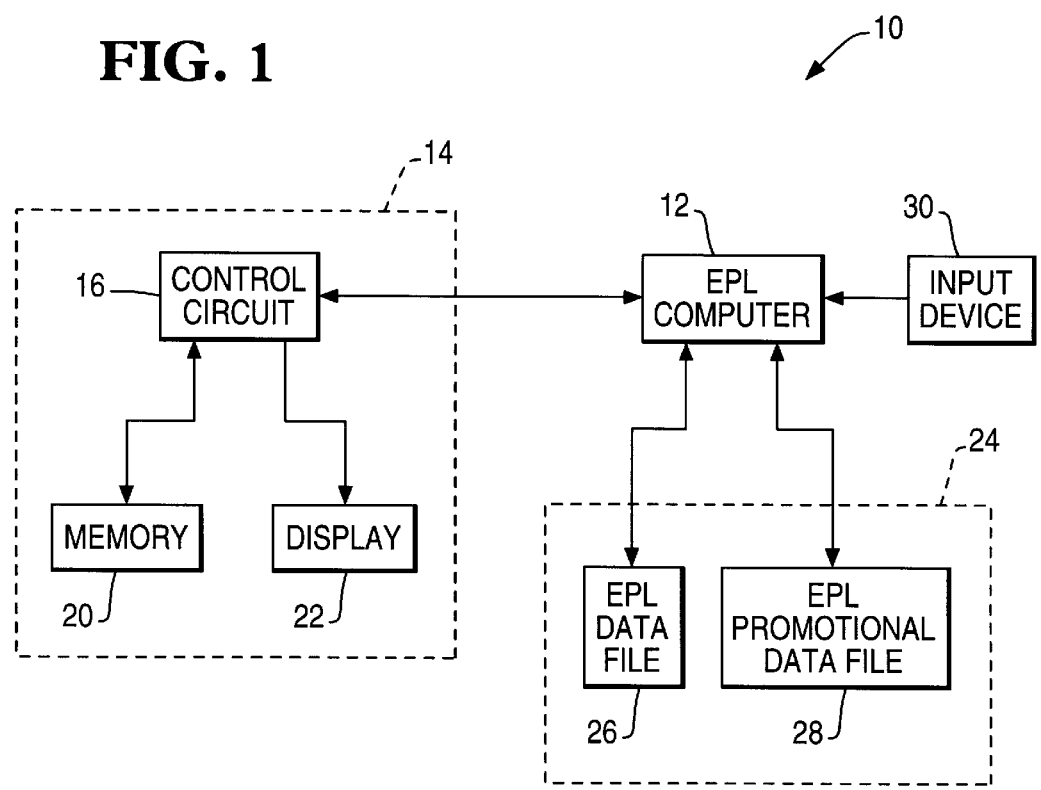
FIG. 1 is a block diagram of an EPL system.

Referring now to FIG. 1, electronic price label (EPL) system 10 includes EPL computer 12 and EPL 14. EPL system 10 may include wireless communication, cable communication, or a combination of both.

EPL computer 12 records, schedules, and transmits all messages to EPL 14 and analyzes status messages from EPL 14. Messages from EPL computer 12 include price change messages, diagnostic messages, and promotional messages.

EPL computer 12 transmits a message containing promotional data from EPL promotional data file 28 and a message instructing EPL 14 to display a particular promotional message.

Promotional data includes promotional messages and a promotional indicator which uniquely identifies each promotional message. Control circuit 16 may display price separately, or as an integral part of a promotional message. The promotional messages and promotional indicators are arranged as a table in EPL promotional data file, such as the one shown below as Table I. The slashes imply blinking or flashing or scrolling between messages. Promotional data may be entered and modified using input device 30, which may be a keyboard.

| Indicator | Promotional Message |
| --- | --- |
| 00 | (No message) |
| 01 | /BUY ONE/ GET ONE |
| 02 | /BUY TWO/ GET TWO |
| 03 | /SPECIAL PURCHASE |
| 04 | /(Message 01)/ (Message 02)/ (Message 03). |

EPL computer 12 maintains and uses EPL data file 26, which contains item information, identification information, item price verifier information, and status information for EPL 14 and other EPLs within system 10.

Storage medium 24 stores EPL data file 26 and EPL promotional data file 28.

EPL 14 is one of many EPLs within system 10. EPL 14 includes control circuit 16, memory 20, and display 22.

Control circuit 16 controls the internal operation of EPL 14. Control circuit 16 stores received messages from EPL computer 12 and transmits response messages to EPL computer 12. Control circuit 16 also controls the display of price and promotional messages, including blinking.

Upon receiving a message containing promotional data, control circuit 16 stores the promotional data in memory 20. Upon receiving an instruction to display a particular promotional message, control circuit 16 retrieves the promotional message from memory 20 and displays it using display 22.

Memory 20 stores promotional data and other data necessary for the proper operation of EPL system 10.

Display 22 displays price and promotional messages. Display 22 is preferably a liquid crystal display (LCD).

Figure 2:
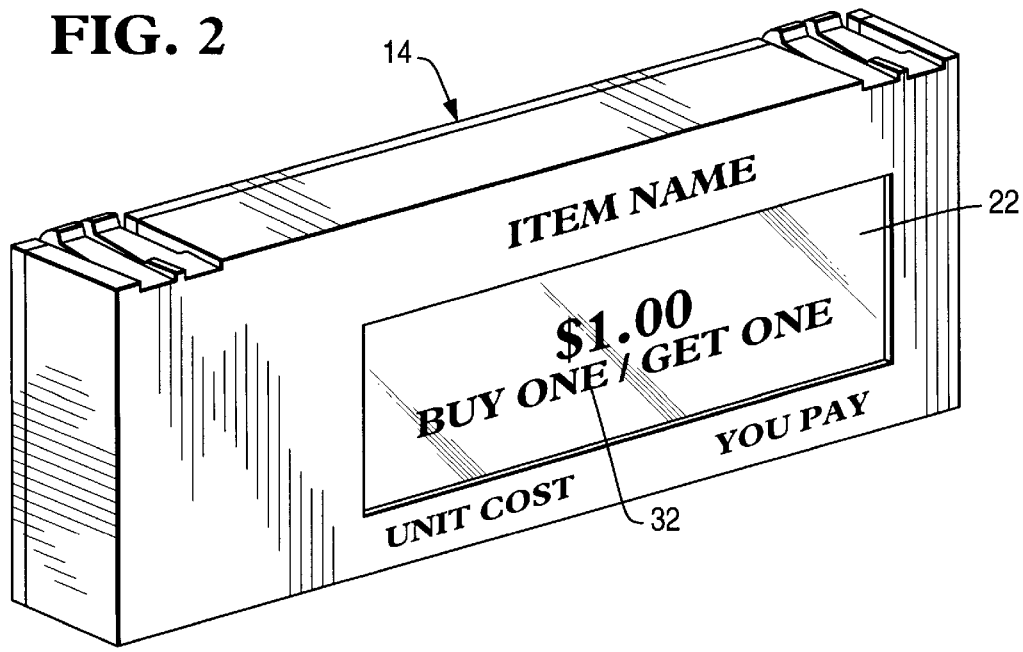
FIG. 2 is a perspective view of an EPL displaying a promotional message.

Turning now to FIG. 2, EPL 14 is shown in more detail. The promotional message 32 is shown as "/BUY ONE/GET ONE".

Figure 3:
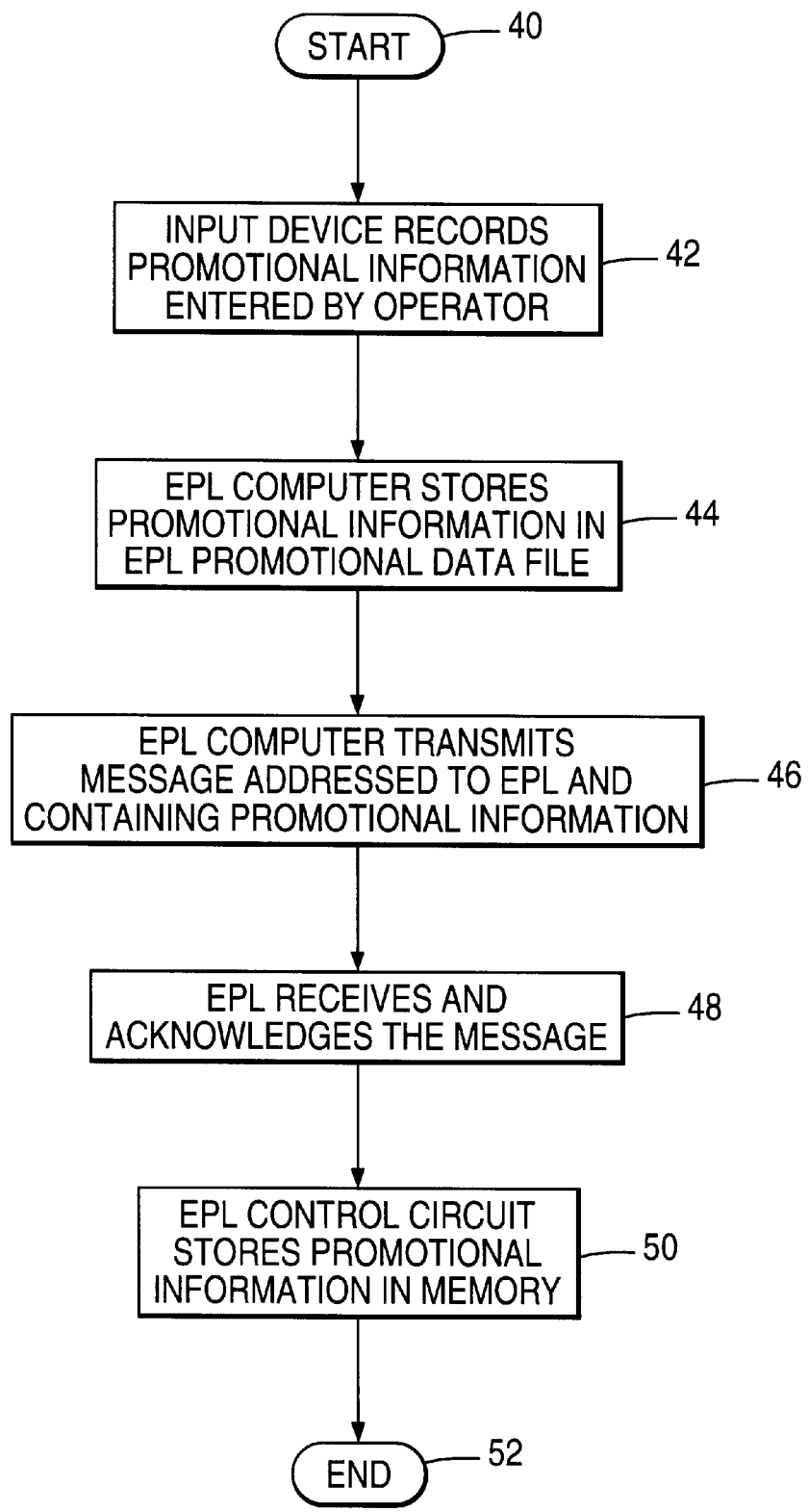
FIG. 3 is a flow diagram illustrating a method of transferring promotional information to an EPL.

Turning now to FIG. 3, a method of transferring promotional information to EPL 14 begins with START 40.

In step 42, input device 30 records promotional information entered by an operator. The operator may update or add promotional data entries one at a time or as a batch.

In step 44, EPL computer 12 stores the promotional data in EPL promotional data file 28.

In step 46, EPL computer 12 transmits a message addressed to EPL 14 and containing the promotional data.

In step 48, EPL control circuit 16 receives and acknowledges the message.

EPL computer 12 may alternatively transmit a broadcast message, which is transmitted multiple times to cover communications loss, to save bandwidth. Using a broadcast message, EPL computer 12 transmits information for a plurality of EPLs at the same time.

In step 50, control circuit 16 stores the promotional data in memory.

In step 52, the method ends.

With reference to FIG. 4, a method of instructing EPL 14 to display a particular promotional message begins with START 60.

In step 62, input device 30 records a promotional indicator designated for EPL 14 by the operator. The operator may also enter a price change for the item.

In step 64, EPL computer 12 stores the promotional indicator in the record of EPL 14 in EPL data file 26. If a price change is also made, EPL computer 12 may or may not store the price information. EPL computer may store a check sum or may store nothing in EPL data file 26. The operator may have EPL computer 12 process these modifications to EPL data file 26 individually or in batch.

In step 66, EPL computer 12 transmits a message, such as a price update message, addressed to EPL 14 and containing the promotional indicator and new price, if applicable, in the EPL data file 26.

In step 68, EPL control circuit 16 receives and acknowledges the message.

In step 70, EPL control circuit 16 compares the promotional indicator in the message with promotional indicators stored in memory 20.

In step 72, EPL control circuit 16 causes display 22 to display the promotional message associated with the promotional indicator in the message, as well as new or existing price information.

In step 74, the method ends.

Advantageously, the present method saves an operator from having to enter promotional messages many times, including once each time an EPL requires a promotional message. Since promotional messages are stored within the EPLs, the method of the present invention does not require additional bandwidth to send the messages after they are stored. Use of promotional indicators provides an efficient shorthand method of assigning promotional messages to EPLs.

Although the present invention has been described with particular reference to certain preferred embodiments thereof, variations and modifications of the present invention can be effected within the spirit and scope of the following claims.

What is claimed is:

1. A method of displaying a promotional message on an electronic display of an electronic price label (EPL) comprising the steps of:

(a) storing the promotional message and a corresponding first promotional indicator in a memory within the EPL;

(b) receiving a promotional indicator from a controlling computer by the EPL;

(c) comparing the first promotional indicator and said received promotional indicator in the EPL; and (d) electronically displaying the promotional message by the EPL on the electronic display if said received promotional indicator corresponds to the first promotional indicator.

2. The method as recited in claim 1, further comprising the steps of:

(e) storing a plurality of promotional messages and promotional indicators, including the one promotional message and the first promotional indicator by the controlling computer prior to step (a);

(f) transmitting a message addressed to the EPL which contains the plurality of promotional messages and promotional indicators by the controlling computer; and (g) receiving the message by the EPL.

3. The method as recited in claim 2, wherein the message addressed to the EPL is a broadcast message which is also addressed to additional EPLs.

4. The method as recited in claim 1, further comprising the step of:

(e) storing a price in the memory.

5. A method of displaying a promotional message on an electronic display of an electronic price label (EPL) comprising the steps of:

(a) storing a plurality of promotional messages, including the one promotional message, and a plurality of promotional indicators associated with the promotional messages, including a first promotional indicator associated with the one promotional message, by a controlling computer;

(b) transmitting a first message addressed to the EPL which contains the promotional messages and the promotional indicators by the controlling computer;

(c) receiving the first message by the EPL;

(d) storing the promotional messages and the promotional indicators in a memory within the EPL;

(e) transmitting a second message addressed to the EPL which contains a second promotional indicator by the controlling computer;

(f) receiving the second message by the EPL;

(g) comparing the second promotional indicator with the promotional indicators in the memory by the EPL; and (h) electronically displaying the promotional message by the EPL if the first and second promotional indicators correspond.

6. A method of displaying a promotional message on electronic displays of first and second electronic price labels (EPLs) comprising the steps of:
 (a) storing the promotional message and a corresponding first promotional indicator in a memory within each of the EPLs;
 (b) receiving a second promotional indicator from a controlling computer by the EPLs;
 (c) comparing the first promotional indicator with the second promotional indicator by the EPLs; and
 (d) electronically displaying the promotional message by the EPLs if the first promotional indicator equals the second promotional indicator.

7. An electronic price label (EPL) system comprising:
 a plurality of EPLs, each including an electronic display and a memory;
 a controlling computer which transmits messages addressed to the EPLs;
 a stored plurality of promotional messages and corresponding promotional indicators accessible to the controlling computer;
 wherein the controlling computer transmits the promotional messages and promotional indicators to the EPLs;
 wherein the EPLs store the promotional messages and promotional indicators in the memories; and
 wherein the EPLs electronically display predetermined promotional messages on their electronic displays after receiving a subsequent message from the controlling computer containing a first promotional indicator and comparing the first promotional indicator to the stored promotional indicators to determine a second promotional indicator equal to the first promotional indicator and associated with the predetermined promotional message.

8. The electronic price label (EPL) system of claim 7 wherein the plurality of EPLs are mounted adjacent corresponding merchandise items on store shelves.

9. The electronic price label (EPL) system of claim 8 wherein the plurality of EPLs display the prices of said adjacent corresponding merchandise items and the promotional messages are at least in part text messages explaining a promotion promoting the sale of said adjacent corresponding merchandise items.

10. The electronic price label (EPL) system of claim 7 wherein said messages transmitted by the controlling computer to the EPLs further include price change messages and diagnostic messages.

11. The electronic price label (EPL) system of claim 7 further comprising an EPL promotional data file associated with the controlling computer and remote from the plurality of EPLs.

12. The electronic price label (EPL) system of claim 11 wherein the EPL promotional data file stores the plurality of promotional messages and corresponding promotional indicators in a table.

13. The electronic price label (EPL) system of claim 12 wherein at least one of the promotional messages stored in said table includes an indicia that implies blinking, flashing or scrolling of said at least one of the promotional messages upon its display by an EPL.

14. The electronic price label (EPL) system of claim 7 further comprising a keyboard for entering and modifying the stored plurality of promotional messages and corresponding promotional indicators.

15. The electronic price label (EPL) system of claim 7 wherein each of said plurality of EPLs includes a control circuit which causes the received promotional messages and promotional indicators to be stored in the memory in the EPL.

* * * * *